United States Patent  
Noguchi et al.

(10) Patent No.: US 11,360,279 B2  
(45) Date of Patent: Jun. 14, 2022

(54) OPTICAL SUBASSEMBLY AND OPTICAL MODULE

(71) Applicant: Lumentum Japan, Inc., Kanagawa (JP)

(72) Inventors: Daisuke Noguchi, Kanagawa (JP); Hiroshi Yamamoto, Tokyo (JP)

(73) Assignee: Lumentum Japan, Inc., Kanagawa (JP)

(*) Notice: Subject to any disclaimer, the term of this patent is extended or adjusted under 35 U.S.C. 154(b) by 172 days.

(21) Appl. No.: 16/713,623

(22) Filed: Dec. 13, 2019

(65) Prior Publication Data

US 2020/0192038 A1 Jun. 18, 2020

(30) Foreign Application Priority Data

Dec. 17, 2018 (JP) ............................. JP2018-235829

(51) Int. Cl.
G02B 6/42 (2006.01)

(52) U.S. Cl.
CPC ......... *G02B 6/4245* (2013.01); *G02B 6/4243* (2013.01); *G02B 6/4248* (2013.01); *G02B 6/4281* (2013.01); *G02B 6/4283* (2013.01)

(58) Field of Classification Search
CPC .. G02B 6/4245; G02B 6/4243; G02B 6/4248; G02B 6/4281; G02B 6/4283
USPC ........................................................ 385/14
See application file for complete search history.

(56) References Cited

U.S. PATENT DOCUMENTS

| 7,366,215 B2* | 4/2008 | Aruga ................. H01S 5/02345 372/38.1 |
| 8,509,575 B2* | 8/2013 | Okada ................. H01S 5/02345 385/14 |
| 2007/0065079 A1* | 3/2007 | Mitamura ............ G02B 6/4201 385/88 |
| 2008/0055925 A1* | 3/2008 | Masamoto ........... G02B 6/0068 362/600 |

FOREIGN PATENT DOCUMENTS

JP 2011-108938 A 6/2011

* cited by examiner

*Primary Examiner* — Jerry M Blevins
(74) *Attorney, Agent, or Firm* — Harrity & Harrity, LLP

(57) ABSTRACT

An optical subassembly includes an eyelet including a first through-hole penetrating from a first surface through a second surface; a first lead terminal, which is to be inserted into the first through-hole, and is configured to transmit an electric signal; a dielectric material, which is filled in a space between the first through-hole and the first lead terminal; a device mounting substrate, on which an optical device is to be mounted, and which includes a first conductor pattern configured to transmit the electric signal to the optical device; a metal block having mounted thereon the device mounting substrate; a temperature regulator placed between the metal block and the eyelet; a relay substrate including a second conductor pattern, which is configured to transmit the electric signal to the optical device; a seat, which protrudes from the first surface in a direction extended from the first through-hole, and has a third surface mounting the relay substrate; and a spacer interposed between the third surface and the relay substrate to establish conduction between a rear surface of the relay substrate and the seat.

20 Claims, 10 Drawing Sheets

OPTICAL SUBASSEMBLY AND OPTICAL MODULE

CROSS-REFERENCE TO RELATED APPLICATION

The present application claims priority from Japanese application JP2018-235829 filed on Dec. 17, 2018, which is hereby expressly incorporated by reference herein.

TECHNICAL FIELD

The present disclosure relates to an optical subassembly and an optical module.

BACKGROUND

The internet and phone networks are mostly built from optical communication networks at present. An optical module used as an interface of a router/switch or a transmission apparatus that is optical communication equipment has an important role of converting an electric signal into an optical signal. The optical module generally takes a mode including an optical subassembly for housing an optical device, a printed circuit board (hereinafter abbreviated as "PCB"), on which an IC for processing signals including a modulated electric signal is mounted among others, and a flexible printed circuit (hereinafter abbreviated as "FPC") board for electrically connecting the optical subassembly and the PCB.

In recent years, the optical module is strongly required to be not only high-speed but also low-price, and the demand for an optical module that is low in cost, and is capable of transmitting/receiving a high-speed optical signal is increasing. As an example of an optical module that meets the demand described above, one using a TO-CAN packaged optical subassembly has been known in which a lead terminal to be inserted into an FPC board or the like protrudes from a metal stem contained in, for example, a can-shaped package. The metal stem is configured so as to include an eyelet having a substantially disc-like shape and a seat provided so as to protrude from the eyelet.

The demand for an optical module is increasing also in the field of interfaces compliant with a standard that is called the Common Public Radio Interface (CPRI), and that is for connecting between an equipment control and radio equipment of a wireless base station. CPRI is a standard for an interface that connects between a radio equipment control (REC) and radio equipment (RE) of the wireless base station. The REC executes baseband signal processing and control/management in the digital domain, and the RE executes amplification, modulation/demodulation, filtering, and the like of a radio signal in the analog domain. When the REC and the RE are to be connected to each other by an optical signal transmissible over a long distance, the RE is usable in an outdoor installation space in the immediate vicinity of an antenna apart from the base station. However, outdoor installation requires the interface to be operational in a harsh temperature environment. The interface is therefore requested to be operational in a wide temperature range called the industrial temperature range (I-temp), which is ranging from −40° C. to 85° C., in addition to being demanded by the market to be low-price.

From the demands described above, technical requirements are high for a TO-CAN-type transmitter optical subassembly (TOSA) that is operational in a wide temperature range and that is broadband. However, high-speed operation on an order of 50 Gbits/s is demanded nowadays, and an example of a light source suitable under this condition is an electroabsorption (EA) modulator integrated laser (hereinafter abbreviated as "EML"). The light absorption characteristics of the EML are heavily dependent on temperature, and a configuration that uses the EML in combination with a temperature regulator, for example, a Peltier device, is therefore required.

In some systems, there may be a configuration in which a Peltier temperature regulator and an optical device are contained in a TO-CAN-type TOSA module. Further, high-frequency wave characteristics may be improved by reinforcing grounding of a sub-mount, on which the optical device is mounted, with a bonding wire in the TO-CAN-type TOSA module containing the Peltier temperature regulator.

However, these systems have difficulties in achieving both the securing of a space for mounting the optical device and the matching of characteristic impedance. The lead terminal is connected directly to a dielectric substrate placed on the seat. A coaxial line includes a through-hole in which the lead terminal is inserted, a dielectric material, and the lead terminal. An increase in the diameter of the through-hole for the purpose of matching the characteristic impedance of the coaxial line increases the distance between the seat, which is formed so as to avoid the through-hole, and the lead terminal. The dielectric substrate is therefore required to be thicker in order to directly connect the dielectric substrate and the lead terminal. On the other hand, the dielectric substrate that is thicker requires the widening of the line width of a conductor pattern formed in the dielectric substrate, in matching the characteristic impedance in the dielectric substrate. The widening of the line width of the conductor pattern decreases the space for mounting the optical device. The securing of the space for mounting the optical device and the matching of the characteristic impedance are therefore difficult to achieve at the same time.

SUMMARY

According to some possible implementations, an optical subassembly may include an eyelet including a first surface, a second surface arranged on an opposite side from the first surface, and a first through-hole penetrating from the first surface through the second surface; a first lead terminal, which is to be inserted into the first through-hole, and is configured to transmit an electric signal; a dielectric material, which is filled in a space between the first through-hole and the first lead terminal; a device mounting substrate, on which an optical device configured to convert at least one of an optical signal and the electric signal into the other is to be mounted, and which includes a first conductor pattern configured to transmit the electric signal to the optical device; a metal block having mounted thereon the device mounting substrate; a temperature regulator placed between the metal block and the eyelet; a relay substrate including a second conductor pattern, the second conductor pattern being configured to transmit the electric signal to the optical device; a seat, which protrudes from the first surface in a direction extended from the first through-hole, and has a third surface, on which the relay substrate is to be mounted; and a spacer interposed between the third surface and the relay substrate to establish conduction between a rear surface of the relay substrate and the seat.

According to some possible implementations, an optical module may include the optical subassembly described above; a printed circuit board; and a flexible printed circuit board to be electrically connected to the printed circuit board and the optical subassembly.

According to some possible implementations, an optical subassembly may include an eyelet including a first surface, a second surface arranged on an opposite side from the first surface, and a first through-hole penetrating from the first surface through the second surface; a first lead terminal, which is to be inserted into the first through-hole, configured to transmit an electric signal; a device mounting substrate, on which an optical device configured to convert at least one of an optical signal or the electric signal into the other is to be mounted, and which includes a first conductor pattern configured to transmit the electric signal to the optical device; a relay substrate including a second conductor pattern configured to transmit the electric signal to the optical device; a seat, which protrudes from the first surface in a direction extended from the first through-hole, and has a third surface on which the relay substrate is to be mounted; and a spacer interposed between the third surface and the relay substrate to establish conduction between a rear surface of the relay substrate and the seat.

According to some possible implementations, securing of a space for mounting the optical device and the matching of characteristic impedance may be achieved at the same time.

DETAILED DESCRIPTION

Figure 1:
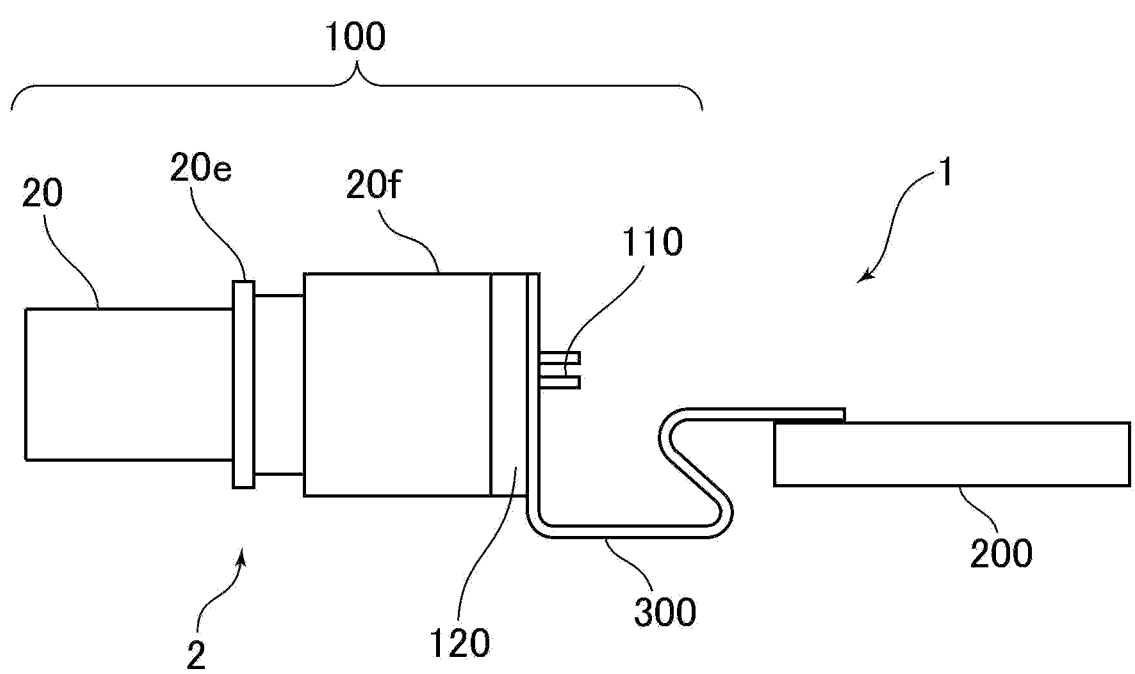
FIG. 1 is an outline of an optical module according to the present disclosure.

Hereinafter, some embodiments will be described specifically and in detail with reference to drawings. In all the drawings to explain the embodiments, the members with the identical or same function bear the same reference numerals, and their repetitive description will be omitted. The drawings used below are only to explain examples in the embodiments, sizes of figures do not always comply with magnification in the examples.

FIG. 1 is an outline of an optical module 1 for optical communication. A modulated electric signal and a control signal, among others, are transmitted to optical subassembly 100 from a drive IC (not shown) mounted on a PCB 200, via an FPC 300 connected by solder or the like to the PCB 200. Optical subassembly 100 houses an optical device, and includes an interface that transmits/receives outgoing light or incident light. Optical subassembly 100 includes an eyelet 120 and an optical receptacle 2. Although not shown, the optical subassembly 100, the PCB 200, and the FPC 300 are built in a casing made of metal or other materials to form the optical module 1.

Figure 10:
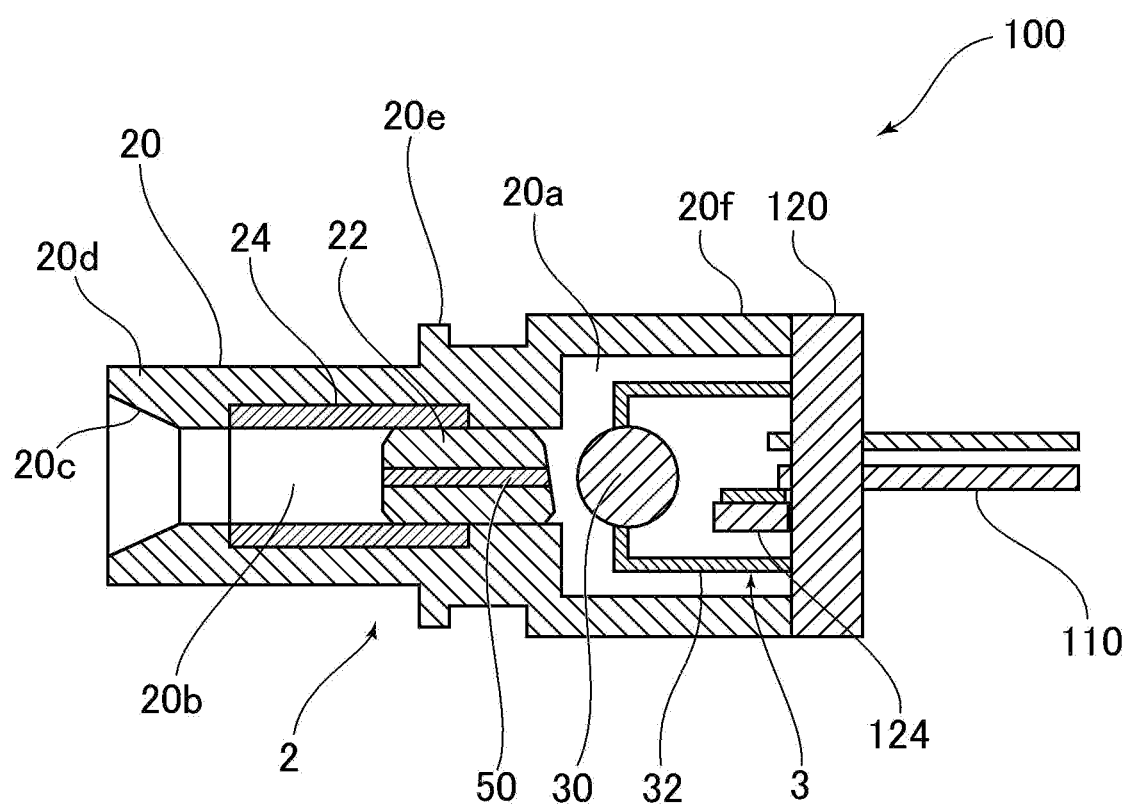
FIG. 10 is a schematic diagram for illustrating a sectional structure of the optical subassembly.

FIG. 10 is a schematic diagram for illustrating a sectional structure of optical subassembly 100. As illustrated in FIG. 10, optical subassembly 100 includes the optical receptacle 2 and an optical package 3. The optical receptacle 2 includes an optical receptacle main body 20, a stub 22, and a sleeve 24.

The receptacle main body 20 is configured so as to include an integrally formed resin member and includes an optical package housing 20f having a columnar outer shape and an optical fiber insertion portion 20d, which has a substantially columnar shape, and has an outer diameter smaller than an outer diameter of the optical package housing 20f. One end surface of the optical package housing 20f and one end surface of the optical fiber insertion portion 20d are joined to each other.

A circular recess portion 20a is formed in the optical package housing 20f coaxially with the outer shape of the optical package housing 20f, which gives the optical package housing 20f a cylindrical shape.

A through-hole 20b, which extends from a leading end surface of the optical fiber insertion portion 20d coaxially with the outer shape of the optical fiber insertion portion 20d and reaches a bottom surface of the recess portion 20a formed in the optical package housing 20f is formed in the optical receptacle main body 20. In short, the recess portion 20a and the through-hole 20b penetrating the optical receptacle main body 20 from the recess portion 20a to the outside are formed in the optical receptacle main body 20.

A tapered portion 20c is formed on an inner wall surface of the through-hole 20b at the leading end and has a tapered shape that increases outward in diameter. This facilitates the insertion of a connector including an optical fiber 50 into the through-hole 20b. A flange 20e is formed along the outer circumference of the optical fiber insertion portion 20d.

The stub 22 is formed by containing zirconia or other materials. The stub 22 has a substantially columnar shape and has a substantially same diameter as the through-hole 20b formed in the optical fiber insertion portion 20d of the optical receptacle main body 20, and holds the optical fiber 50 coaxially with the stub 22. The stub 22 is inserted and fixed into the optical fiber insertion portion 20d of the optical receptacle main body 20 by press fitting or other methods. A right end surface of the stub 22 is obliquely polished. Thus, interference between light input from the optical fiber 50 and reflected light therefrom is prevented in this manner.

A left side surface of the stub 22 of the optical receptacle 2 is abut against the connector (not shown) including the optical fiber 50, which is inserted into the through-hole 20b from the outside, to thereby couple the optical fiber 50 that is included in the connector and the optical fiber 50 that is held by the stub 22.

The sleeve 24 is configured so as to include a slit sleeve made of zirconia or other materials. The sleeve 24 has a cylindrical shape and has a substantially same inner diameter as the through-hole 20b. With the sleeve 24, the position inside the through-hole 20b of the optical fiber 50 inserted into the optical fiber insertion portion 20d can be adjusted.

The optical package 3 includes a spherical lens 30. The optical package 3 also includes a lens support portion 32, which is a metal member having a cylindrical shape with a bottom having an opening formed in its bottom surface and has a substantially same diameter as the lens 30. The opening of the lens support portion 32 is formed coaxially with the shape of the bottom surface of the lens support portion 32. The lens 30 is fit into the opening of the lens support portion 32. That is, the lens support portion 32 supports the lens 30. The optical package 3 also includes a stem that includes the eyelet 120 and seat 124 described above.

The optical subassembly 100 is assembled by fixing through bonding a joining surface of the recess portion 20a of the optical receptacle 2 to a joining surface on a first surface 121 of the eyelet 120. When assembling, the lens support portion 32 welded to the eyelet 120 and the lens 30 fit into the lens support portion 32 are formed so as to be contained inside the recess portion 20a of the optical receptacle 2. Specifically, the lens 30 and the lens support portion 32 are housed in the recess portion 20a of the optical receptacle main body 20. It should be noted that the method of bonding the optical receptacle 2 and the optical package 3 to each other is not limited to the one given here.

Examples of the optical subassembly 100 may include an optical transmission module (transmission optical subassembly: TOSA), which includes a laser diode, an EML, or a similar light emitting device therein, and converts an electric signal into an optical signal to transmit the optical signal, an optical reception module (receiver optical subassembly: ROSA), which has a light receiving device, typically, a photo diode, therein, and converts a received optical signal into an electric signal, and a bidirectional module (bidirectional optical subassembly: BOSA), which encompasses both functions of the optical transmission module and the optical reception module. The present embodiment is applicable to any of the optical subassemblies given above.

Figure 2:
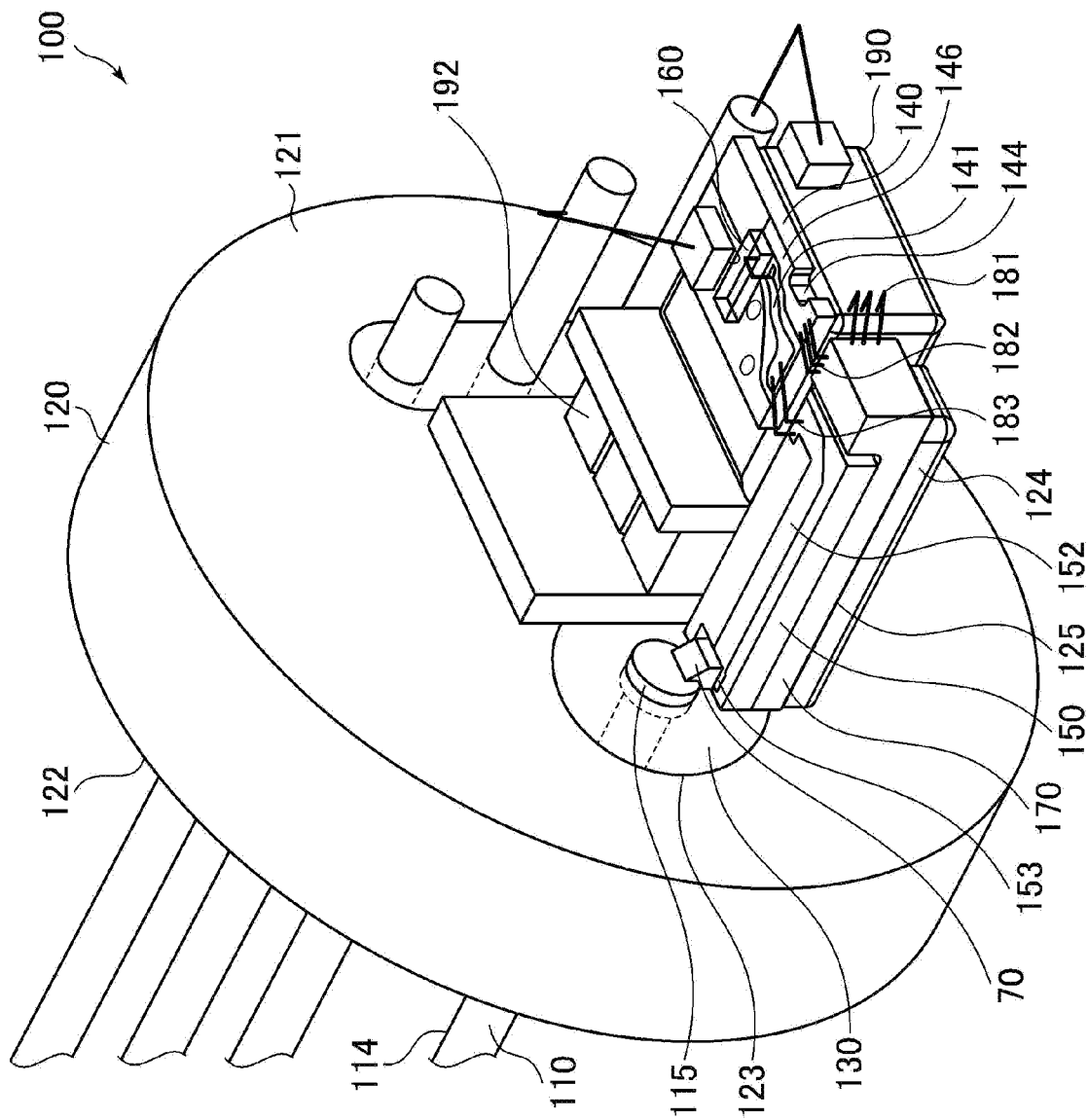
FIG. 2 is a schematic perspective view for illustrating an internal structure of an optical subassembly.

FIG. 2 is a schematic perspective view for illustrating an internal structure of optical subassembly 100. Optical subassembly 100 includes the eyelet 120, which is shaped like a disc having a diameter of, for example, 5.6 mm, and which is conductive and made of, for example, metal. The eyelet 120 includes the first surface 121 and a second surface 122 arranged on the opposite side from the first surface 121. The eyelet 120 also includes a first through-hole 123 penetrating from the first surface 121 through the second surface 122.

A first lead terminal 110 through which an electric signal is transmitted is inserted into the first through-hole 123 of the eyelet 120. A dielectric material 130 is filled in a space between the first through-hole 123 and the first lead terminal 110. The dielectric material 130 is glass, for example. The eyelet 120, the dielectric material 130, and the first lead terminal 110 form a coaxial line. This coaxial line is hereinafter referred to as "glass coaxial portion."

The optical subassembly 100 also includes the seat 124, which protrudes from the first surface 121 of the eyelet 120 in a direction extended from the first through-hole 123, and which is conductive and made of, for example, metal. The eyelet 120 and the seat 124 are integrally formed, and together form the stem.

The seat 124 includes a third surface 125 on which a relay substrate 150 is to be mounted. The optical subassembly 100 according to the present disclosure includes an optical device 160, which converts at least one of an optical signal or an electric signal into the other, and the relay substrate 150 includes a second conductor pattern 152, which transmits an electric signal to the optical device 160. The relay substrate 150 is configured so that the second conductor pattern 152 has been formed on a dielectric substrate. As a wiring pattern, the second conductor pattern 152 is directly connected to the first lead terminal 110 by solder 70 made from, for example, a gold-tin alloy.

The first lead terminal 110 through which a modulated electric signal is transmitted includes a small-diameter portion 114 and a large-diameter portion 115 as illustrated in FIG. 2. The large-diameter portion 115 is provided at an end portion of the small-diameter portion 114 and is larger in diameter than the small-diameter portion 114. At least a part of the large-diameter portion 115 is exposed on the first surface 121 side from the first surface 121. The large-diameter portion 115 and the second conductor pattern 152 placed on the relay substrate 150 are soldered. For example, the large-diameter portion 115 of the first lead terminal 110 and the relay substrate 150 are connected by the solder 70 made from a gold-tin alloy, or the like. The diameter of the small-diameter portion 114 is set to 0.28 mm and the diameter of the large-diameter portion 115 is set to 0.4 mm. In order to match the characteristic impedance of the glass coaxial portion to 50 ohm, low-permittivity glass that has 4.1 as the value of a specific dielectric constant εr is used, and the diameter of the glass portion is set to 1.3 mm. Like this, employment of a configuration in which the first lead terminal 110 has the large-diameter portion 115 enables further impedance matching in the optical module 1, in which the first lead terminal 110 and the relay substrate 150 are soldered. It should be noted that the connection between the first lead terminal 110 and the relay substrate 150 is not limited to soldering and may be brazing (brazing and soldering) that uses another brazing filler metal.

It is preferred to employ configuration in which, a portion in which the second conductor pattern 152 formed on a top surface of the relay substrate 150 is soldered to the large-diameter portion 115 of the first lead terminal 110 includes a stub 153, which is a wide portion. With this configuration, the capacitance component can be increased and further impedance matching is accomplished as a result. Another preferred effect resides in that the first lead terminal 110 and the second conductor pattern 152 can stably be connected by solder despite mounting fluctuations of the relay substrate 150 in a connection portion between the first lead terminal 110 and the second conductor pattern 152.

As illustrated in FIG. 2, the optical device 160 is mounted on a device mounting substrate 140. Note that, the optical device 160 may be any one of a direct modulation laser, an electroabsorption modulator integrated laser, and a combination of a laser and a Mach-Zehnder modulator. An electroabsorption modulator may be used as the optical device 160.

The device mounting substrate 140 may be made of ceramic, for example, aluminum nitride having a thermal expansion coefficient close to that of the optical device 160, and the optical device 160 is bonded by die bonding to the device mounting substrate 140. The optical device 160 is mounted on a surface of the device mounting substrate 140, and a first conductor pattern 141 serving as a transmission line along which an electric signal is transmitted to the optical device 160 is formed on the surface (mounting surface) side of the device mounting substrate 140 to form a microstrip line. The first conductor pattern 141 and the second conductor pattern 152 are connected by a third bonding wire 183, and an electric signal to be transmitted to the optical device 160 is transmitted from the relay substrate 150 to the device mounting substrate 140 via the third bonding wire 183.

The device mounting substrate 140 has, on its rear surface, a metallized pattern, and is connected to a metal block 190, on which the device mounting substrate 140 is mounted. A temperature regulator 192 is placed between the metal block 190 and the eyelet 120. A Peltier device may be used as the temperature regulator 192.

In an optical module for low-speed communication use, the characteristic impedance of the glass coaxial portion does not need to be matched exactly to 50 ohm, and it is sufficient if the characteristic impedance is matched to, for example, 30 ohm or so. The glass coaxial portion in this case can be implemented by, for example, setting the lead terminal diameter to 0.25 mm, setting the diameter of the dielectric material to 130 to 0.8 mm, and using glass that has a specific dielectric constant of 6.7 as the dielectric material 130. This is because, in low-speed use, a signal is transmissible at that level of characteristic impedance, and downsizing is accordingly given priority. An optical module for high-speed communication use in which the transmission rate is, for example, 40 Gbits/s or higher, however, may need a TO-CAN package that is broadband and that has finished matching the characteristic impedance to 50 ohm±10 ohm.

However, the specific dielectric constant of the glass that is the dielectric material 130 used to hold the first lead terminal 110 is 4 to 7, which means that a physical space is needed in order to match the characteristic impedance of the glass coaxial portion to 50 ohm±10 ohm. For instance, the first through-hole 123 may need to be 1 mm or more in diameter in order to form a coaxial line that is matched in characteristic impedance to 50 ohm±10 ohm from glass having a specific dielectric constant of 6.7. This limitation naturally determines the size of the optical module 1.

The third surface 125 may be placed so as to be farther from the center of the eyelet 120 than a mounting surface of the metal block 190, on which the device mounting substrate 140 is mounted, is to the center of the eyelet 120, in a direction orthogonal to the third surface 125. When the characteristic impedance of the glass coaxial portion is to be matched to 50 ohm±10 ohm, the diameter of the first through-hole 123 may need to be larger than when the characteristic impedance is to be matched to, for example, 30 ohm, due to the circumstance described above. It is preferred, for reasons related to the manufacturing process, to avoid superimposition between the first through-hole 123 and the seat 124 in a direction extended from the first lead terminal 110. That is, a configuration that avoids the superimposition between the first through-hole 123 and the seat 124 in a direction extended from the first lead terminal 110 is preferred because the configuration facilitates the forming of the first through-hole 123 when the seat 124 and the eyelet 120 are integrally formed. The configuration that avoids the superimposition between the first through-hole 123 and the seat 124 may provide the seat 124 so as to circumvent the first through-hole 123, which has a large diameter, and accordingly increases the distance between the seat 124 formed so as to circumvent the first through-hole 123 and the first lead terminal 110.

Meanwhile, the relay substrate 150 being a dielectric substrate and the first lead terminal 110 may be arranged at a close distance from each other in order to directly connect the relay substrate 150 and the first lead terminal 110 by the solder 70. However, shortening the distance between the relay substrate 150 and the first lead terminal 110 by an increase in the thickness of the relay substrate 150 may lead to an increase in the line width of the second conductor pattern 152 formed on the relay substrate 150. This is because the relay substrate 150 may need to form, together with the seat 124, a microstrip line that has a characteristic impedance of 50 ohm±10 ohm. For example, when aluminum nitride, which has a specific dielectric constant of 8.7, is used as a material forming the relay substrate 150, and the thickness of the relay substrate 150 is 0.5 mm, the line width of the second conductor pattern 152 may need to be 0.5 mm, necessitating enlargement of the relay substrate 150 itself. An increase in the size of the relay substrate 150 inevitably reduces the size of the device mounting substrate 140, with the result that the space for mounting the optical device 160 becomes shorter.

A configuration may be employed in which a spacer 170 is interposed between the relay substrate 150 and the third surface 125 of the seat 124, and the spacer 170 establishes conduction between a rear surface of the relay substrate 150 and the seat 124. A ground potential point of the seat 124 may be lifted to the level of a top surface of the spacer 170. The relay substrate can therefore be made as thin as 0.2 mm, for example. The second conductor pattern 152 formed on the relay substrate 150, which is a dielectric substrate to be connected to the first lead terminal 110, is consequently prevented from increasing in line width. A line width of the second conductor pattern 152 formed on the relay substrate 150 may be set to 0.2 mm. As a result, the relay substrate 150 is prevented from increasing in size, and the securing of a space for mounting the optical device 160 and the matching of characteristic impedance can be achieved at the same time.

As illustrated in FIG. 2, the spacer 170 including a ground conductor is configured to superimpose over the dielectric material 130 when viewed from a direction extended from the first lead terminal 110, or a direction orthogonal to the first surface. The spacer 170 may be made of ceramic, for example, aluminum nitride, and conduction between the front and rear of the spacer 170 may be established by forming a plurality of embedded via holes in the ceramic substrate. Alternatively, the spacer 170 may be made from a metal plate having a thickness of about 0.3 mm to 0.6 mm. A case in which the spacer 170 is made from a metal plate is taken as an example. The use of a metal plate as the spacer 170 reduces the cost of processing.

As illustrated in FIG. 2, parts of the surface of the spacer 170 do not superimpose with the relay substrate 150 and are exposed. One of the parts of the spacer 170 that are exposed from under the relay substrate 150 is electrically connected to the metal block 190 by a first bonding wire 181. Another of the parts of the spacer 170 that are exposed from the relay substrate 150 is electrically connected to a first ground pattern 146 formed on the device mounting substrate 140, by a second bonding wire 182. The configuration in which a part of the spacer 170 that is exposed from the relay substrate 150 is electrically connected to the metal block 190 by the first bonding wire 181 improves high-frequency wave characteristics.

Figure 3:
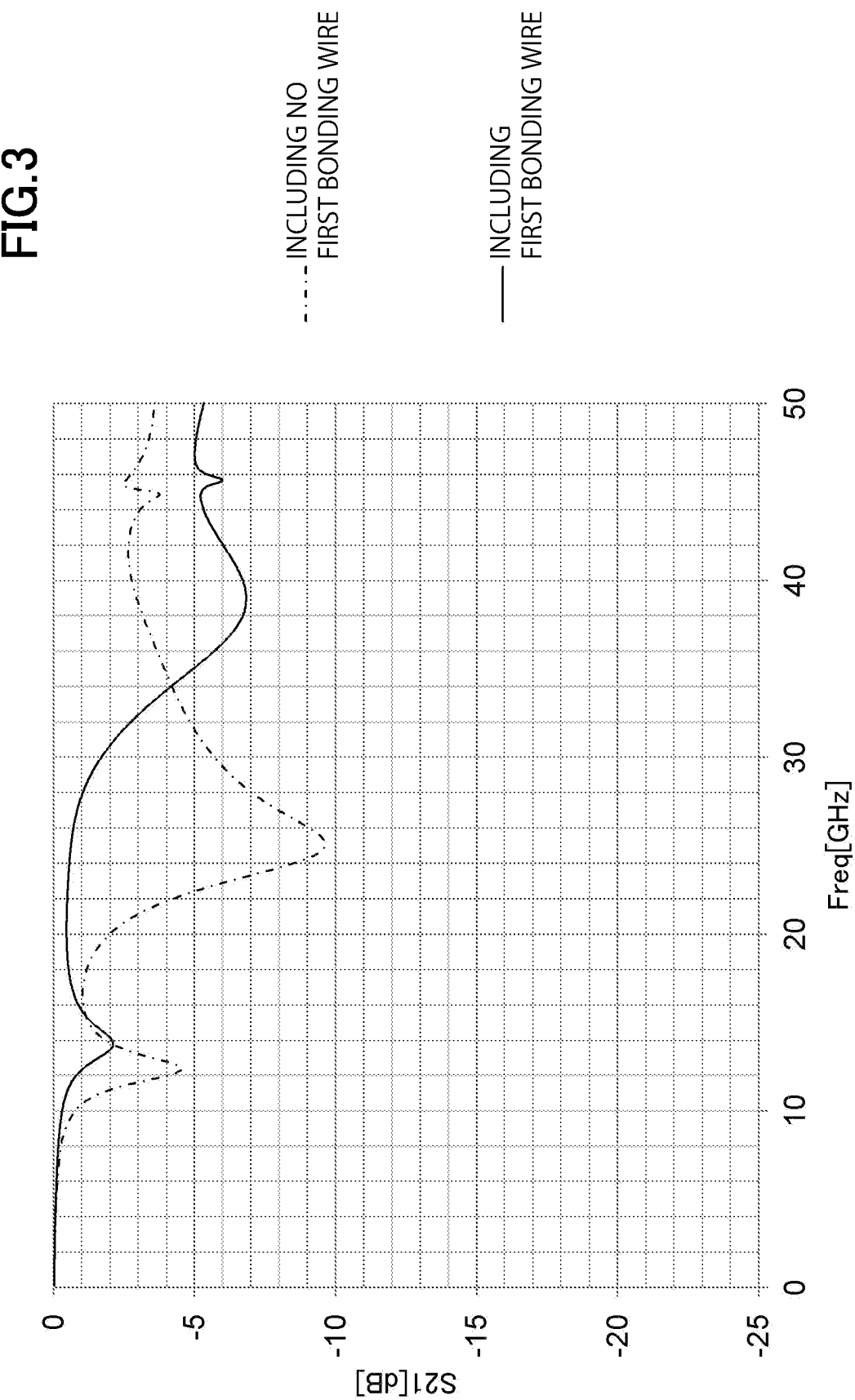
FIG. 3 is a graph in which transmission characteristics observed when a first bonding wire is provided and when the first bonding wire is not provided are calculated with the use of a High Frequency Structure Simulator (HFSS), which is a three-dimensional electromagnetic field solver.
Figure 4:
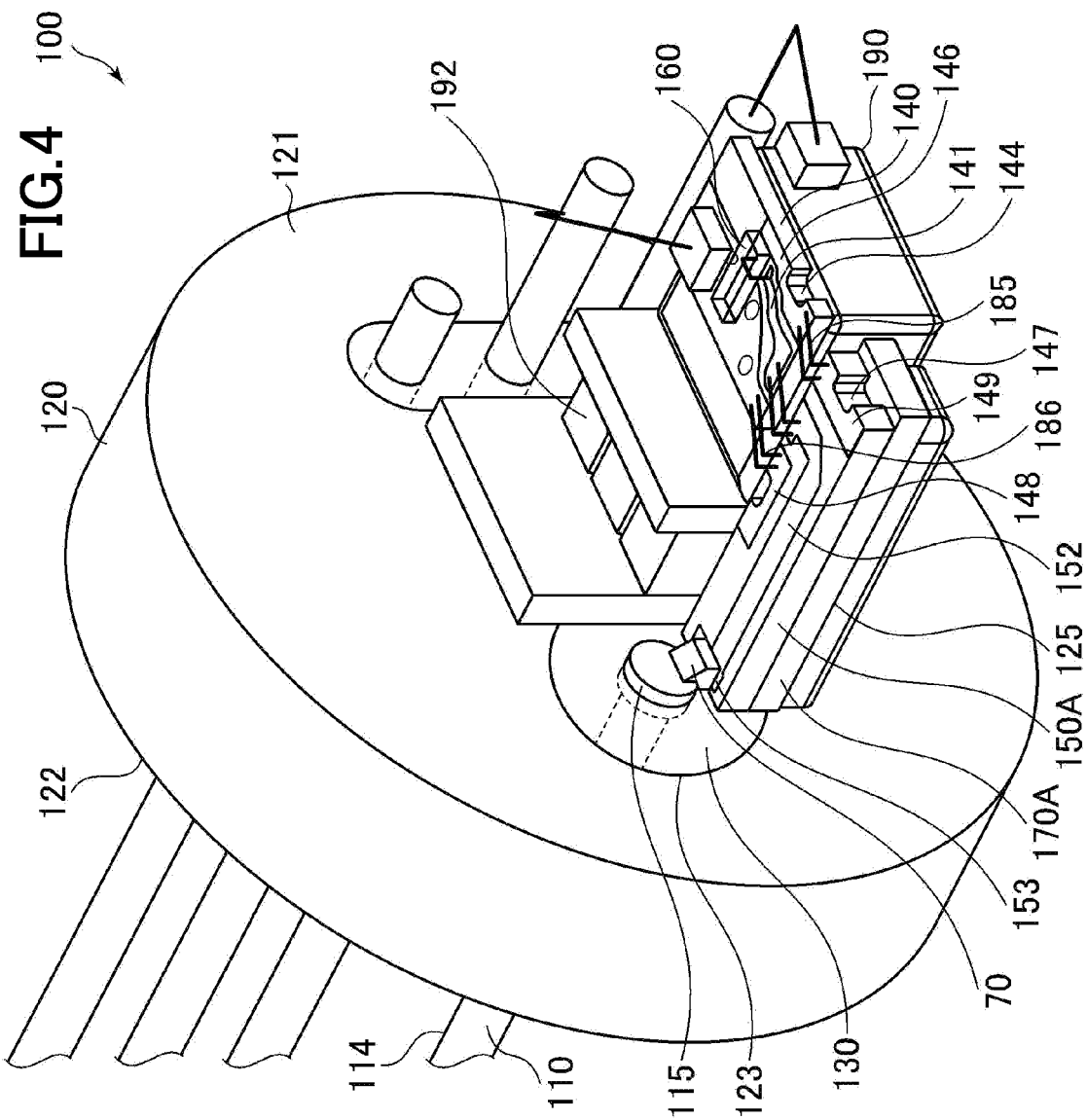
FIG. 4 is a schematic perspective view for illustrating an internal structure of an optical subassembly according.

FIG. 3 is a graph in which transmission characteristics (S21) observed when the first bonding wire 181 is provided and when the first bonding wire 181 is not provided are calculated with the use of a High Frequency Structure Simulator (HFSS), which is a three-dimensional electromagnetic field solver. The transmission characteristics of a section from the tip of the glass coaxial portion (the second surface 122 side of the eyelet) to a point immediately before the optical device 160 are shown in this figure. The example illustrated in FIG. 2 is used as a configuration example in which the first bonding wire 181 is provided. As a configuration example in which the first bonding wire 181 is not provided, an example illustrated in FIG. 4 is used in which a castellation 147 is formed in each of a shorter side and longer side of a relay substrate 150A, and a second ground pattern 148 and a third ground pattern 149 are formed to be connected to the castellations 147. The second ground pattern 148 and the third ground pattern 149 are connected to the first ground pattern 146 formed on the device mounting substrate 140, by a bonding wire 185 and a bonding wire 186, respectively. In the example illustrated in FIG. 4, the third bonding wire 183, which is signal wiring, is sandwiched on each side by the bonding wires 185 and 186, which are grounding wiring, and the connection between the relay substrate 150A and the device mounting substrate 140 is what is called a ground-signal-ground (GSG) connection.

As shown in FIG. 3, the transmission characteristics, particularly those at 20 GHz to 35 GHz, are markedly improved in the configuration illustrated in FIG. 2, which includes the first bonding wire 181, from the configuration illustrated in FIG. 4, which does not include the first bonding wire 181. The improvement is presumably owing to the more solid connection between the spacer 170 and the metal block 190.

However, the configuration illustrated in FIG. 4 is encompassed in the present embodiment because the object of the present embodiment, which is to achieve both the securing of a space for mounting the optical device 160 and the matching of characteristic impedance, is attainable even with the configuration of FIG. 4.

The configuration illustrated in FIG. 2 has additional noteworthy features other than the successful achievement in both the securing of a space for mounting the optical device 160 and the matching of characteristic impedance, and the improved transmission characteristics in a high-frequency wave range.

Figure 5:
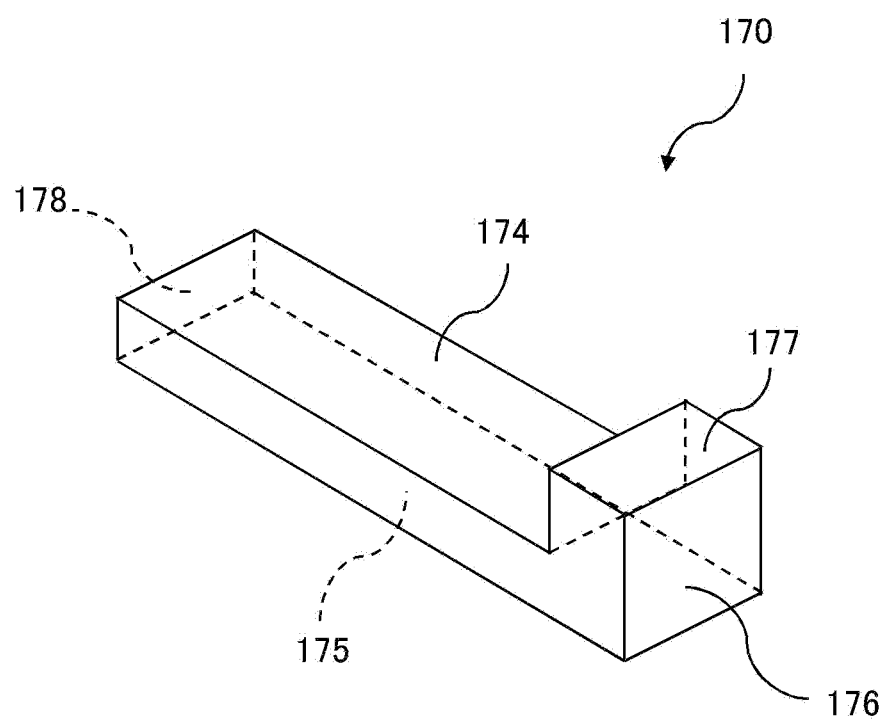
FIG. 5 is a schematic perspective view for illustrating a structure of a spacer.

First, as illustrated in FIG. 5, the spacer 170 has the shape of the letter L and includes a fourth surface 174 on which the relay substrate 150 is to be mounted and a fifth surface 175 to be mounted on the seat. The fourth surface 174 and the fifth surface 175 are illustrated as a top surface and a bottom surface, respectively, in FIG. 5. The spacer 170 also includes a six surface 176, which intersects with the fifth surface 175 and which is opposed to the first surface 121 of the eyelet 120 illustrated in FIG. 2, and a seventh surface 177, which intersects with the sixth surface 176 and which is opposed to the fifth surface 175. The sixth surface 176 is a side surface farthest from the first surface 121 of the eyelet 120 and is connected to the metal block 190 by the first bonding wire 181. In addition, the seventh surface 177 is illustrated in FIG. 5 as one of top surfaces along with the fourth surface 174 and, as illustrated in FIG. 2, is connected to the first ground pattern 146 on the device mounting substrate 140 by the second bonding wire 182. Although the seventh surface 177 is illustrated as one of top surfaces along with the fourth surface 174, the relay substrate 150 is not mounted on the top surface that is the seventh surface 177 whereas the relay substrate 150 is mounted on the top surface that is the fourth surface 174.

In the example illustrated in FIG. 2 and FIG. 5, the spacer 170 has a configuration in which there is a level difference between the fourth surface 174 and the seventh surface 177, and the distance between the seventh surface 177 and the fifth surface 175 is greater than the distance between the fourth surface 174 and the fifth surface 175. Specifically, the spacer 170 is thicker in an area in which the relay substrate 150 is not mounted than an area in which the relay substrate 150 is mounted and is shaped so as to protrude on the side where the relay substrate 150 is mounted (upward in FIG. 2).

The optical subassembly 100, despite being small in size, can have a configuration in which the first bonding wire 181 (see FIG. 2) is provided with ease, by shaping the spacer 170 into an L-shape and giving the sixth surface 176, which is connected to the metal block 190 by the first bonding wire 181, an area larger than that of a side surface 178 (see FIG. 5), which is closest to the eyelet 120.

In addition, the relay substrate 150 can have a size smaller than in the configuration illustrated in FIG. 4 by employing a configuration in which the seventh surface 177 is connected to the first ground pattern 146 by the second bonding wire 182 and the relay substrate 150 is not mounted on the seventh surface 177. As a result, more relay substrates 150 can be yielded from the same area in the manufacturing process, and the cost of the relay substrate 150 can accordingly be reduced.

Specifically, whereas the configuration illustrated in FIG. 4 may need castellation 147 to be formed in the shorter side of the relay substrate 150A and the third ground pattern 149 connected to the castellation 147 for ground connection to the first ground pattern 146 via the bonding wire 185, the example illustrated in FIG. 2 in which the seventh surface 177 of the spacer 170 is connected to the first ground pattern 146 via the second bonding wire 182 does not need the castellation 147 and third ground pattern 149 illustrated in FIG. 4, and can therefore reduce the size and cost of the relay substrate 150.

Furthermore, as is apparent from the results shown in FIG. 3, excellent high-frequency wave characteristics are accomplished without forming the castellation 147 that is placed in the longer side of the relay substrate 150A illustrated in FIG. 4, and the second ground pattern 148 and the bonding wire 186, which are also illustrated in FIG. 4. Steps of forming the castellation 147, the second ground pattern 148, and the bonding wire 186 are therefore not needed, and the cost of the relay substrate 150 can therefore be reduced even more.

Another noteworthy feature is that solder used to mount the relay substrate 150 on the spacer 170 is prevented from flowing onto the seventh surface 177 by shaping the spacer 170 so as to be thicker in an area in which the relay substrate 150 is not mounted than in an area in which the relay substrate 150 is mounted, and so as to protrude on the side where the relay substrate 150 is mounted (upward in FIG. 2). The prevention improves the reliability of connection between the second bonding wire 182 and the spacer 170. That is, with the flatness of the seventh surface 177 ensured, stable wire bonding may be accomplished and the yield may accordingly be improved.

In the configuration illustrated in FIG. 2, at least a part of the Peltier device, which is the temperature regulator 192, superimposes with a part of the first through hole 123 when viewed from a direction perpendicular to the first surface 121. With this configuration, an area for placing the temperature regulator 192 can be secured in the eyelet 120 even when the first through-hole 123 is expanded to have as large a diameter as, for example, 1 mm, or more in order to be applicable for high-speed communication use as described above.

In the configuration illustrated in FIG. 2, a first castellation 144 electrically connecting the first ground pattern 146 and the metal block 190 is formed in an end portion of the device mounting substrate 140. The first castellation 144 solidifies grounding between the metal block 190 and the first ground pattern 146.

As described above with reference to FIG. 2, solder used to mount the relay substrate 150 on the spacer 170 is prevented from flowing onto the seventh surface 177 by forming a level difference between the fourth surface 174 and the seventh surface 177, and making the distance between the seventh surface 177 and the fifth surface 175 greater than the distance between the fourth surface 174 and the fifth surface 175. This effect is attainable in other examples as well.

Figure 6:
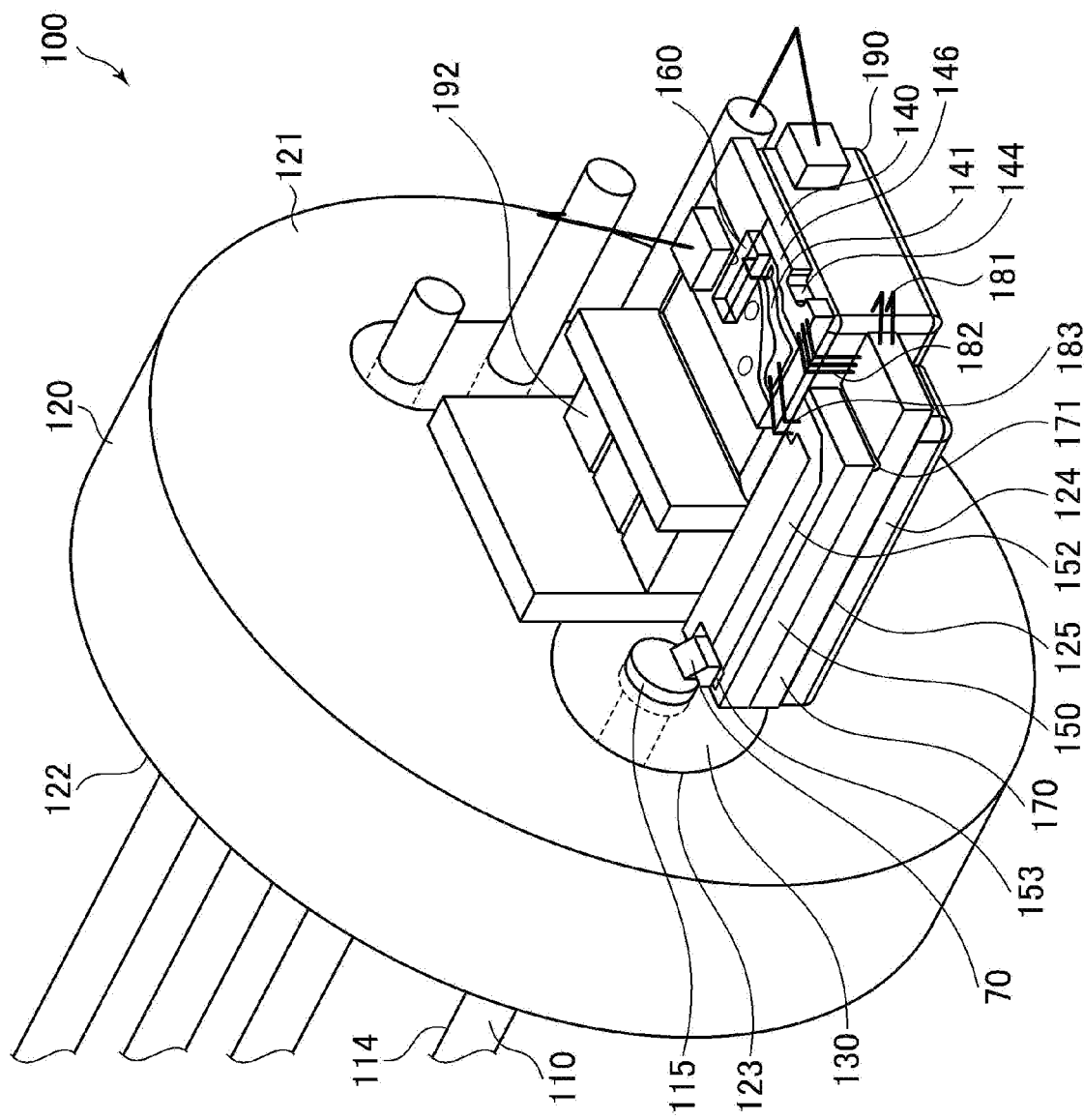
FIG. 6 is a schematic perspective view for illustrating an internal structure of an optical subassembly.

FIG. 6 is a schematic perspective view for illustrating still another example of the optical subassembly 100. In the example illustrated in FIG. 6, the spacer 170 has a groove 171 separating the fourth surface 174, on which the relay substrate 150 is mounted, and the seventh surface 177, on which the relay substrate 150 is not mounted, from each other. As a result, solder used to mount the relay substrate 150 on the spacer 170 is prevented from flowing onto the seventh surface 177, and the prevention improves the reliability of connection between the second bonding wire 182 and the spacer 170. That is, with the flatness of the seventh surface 177 ensured, stable wire bonding is accomplished and the yield can accordingly be improved.

However, the configuration illustrated in FIG. 2 in which the spacer 170 has a level difference between the fourth surface 174 and the seventh surface 177, and the distance between the seventh surface 177 and the fifth surface 175 is greater than the distance between the fourth surface 174 and the fifth surface 175 allows the second bonding wire 182 to be shorter than in the configuration illustrated in FIG. 6. Specifically, the seventh surface 177 protrudes farther than the fifth surface 175 on the side where the relay substrate 150 is mounted (upward in FIG. 2), and the second bonding wire 182 can be made much shorter, which is desired in accomplishing low impedance.

In addition, as described above, the configuration illustrated in FIG. 2 and FIG. 5 gives the sixth surface 176, which is connected to the metal block 190 by the first bonding wire 181, an area larger than that of the side surface 178, which is closest to the eyelet 120, and is accordingly easier to form the first bonding wire 181 than the configuration illustrated in FIG. 6. In the example illustrated in FIG. 6, however, the shape of the spacer 170 is simplified and the overall volume is reduced. This gives the example of FIG. 6 an advantage in terms of cost over the example illustrated in FIG. 2 and FIG. 5, in which the spacer 170 has the shape of the letter L.

Figure 7:
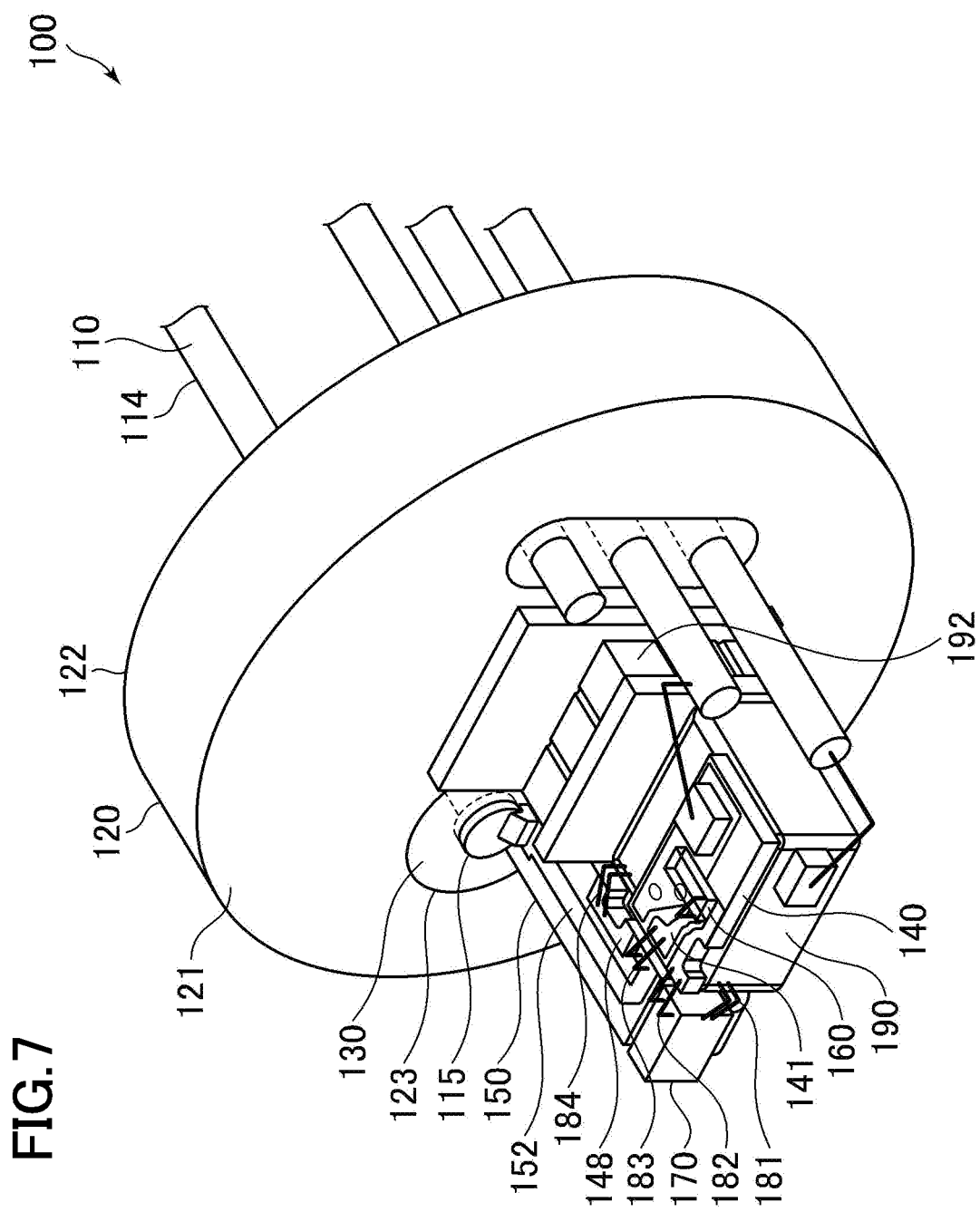
FIG. 7 is a schematic perspective view for illustrating an internal structure of an optical subassembly.
Figure 8:
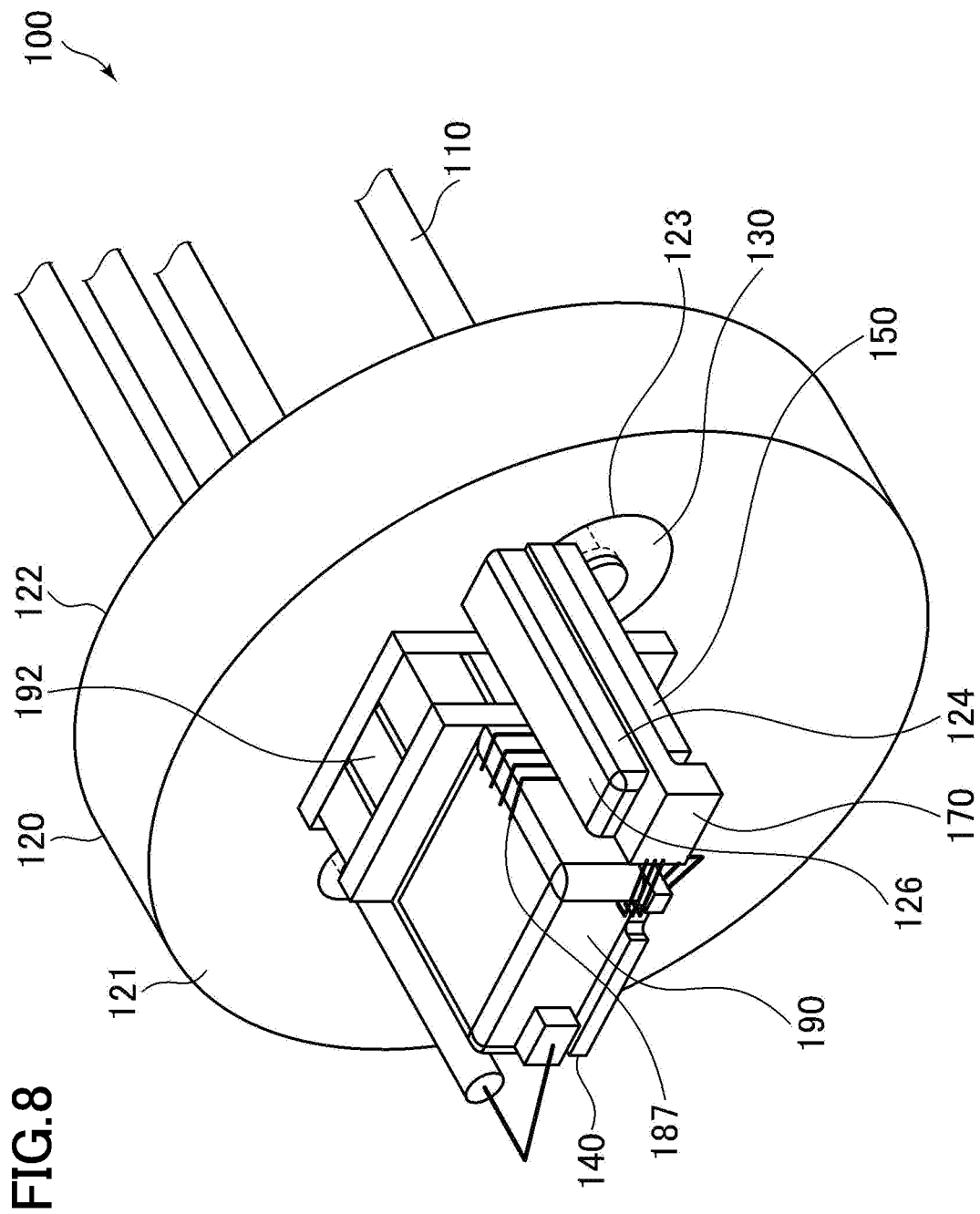
FIG. 8 is a schematic perspective view for illustrating an internal structure of an optical subassembly.

Configurations illustrated in FIG. 7 and FIG. 8 are effective in enhancing the grounding and improving high-frequency wave characteristics even more.

FIG. 7 is a perspective view for illustrating yet still another example of the optical subassembly 100 and is a perspective view viewed from the device mounting side of the device mounting substrate 140. FIG. 8 is a perspective view for illustrating yet still another example of the optical subassembly 100 and is a perspective view viewed from a side of the metal block 190 where the device mounting substrate 140 is not mounted.

The configuration example illustrated in FIG. 7 includes, in addition to the components of the configuration example illustrated in FIG. 2, a fourth bonding wire 184, which electrically connects the second ground pattern 148 formed on the relay substrate 150 to the metal block 190. In the configuration of FIG. 7, the third bonding wire 183 electrically connecting the first conductor pattern 141 and the second conductor pattern 152 is placed between the second bonding wire 182 and the fourth bonding wire 184 when viewed from a direction orthogonal to the third surface 125. The configuration example illustrated in FIG. 8 includes, in addition to the components of the configuration example illustrated in FIG. 2, a fifth bonding wire 187, which connects a rear surface 126 opposed to the third surface 125 of the seat 124 to the metal block 190.

Figure 9:
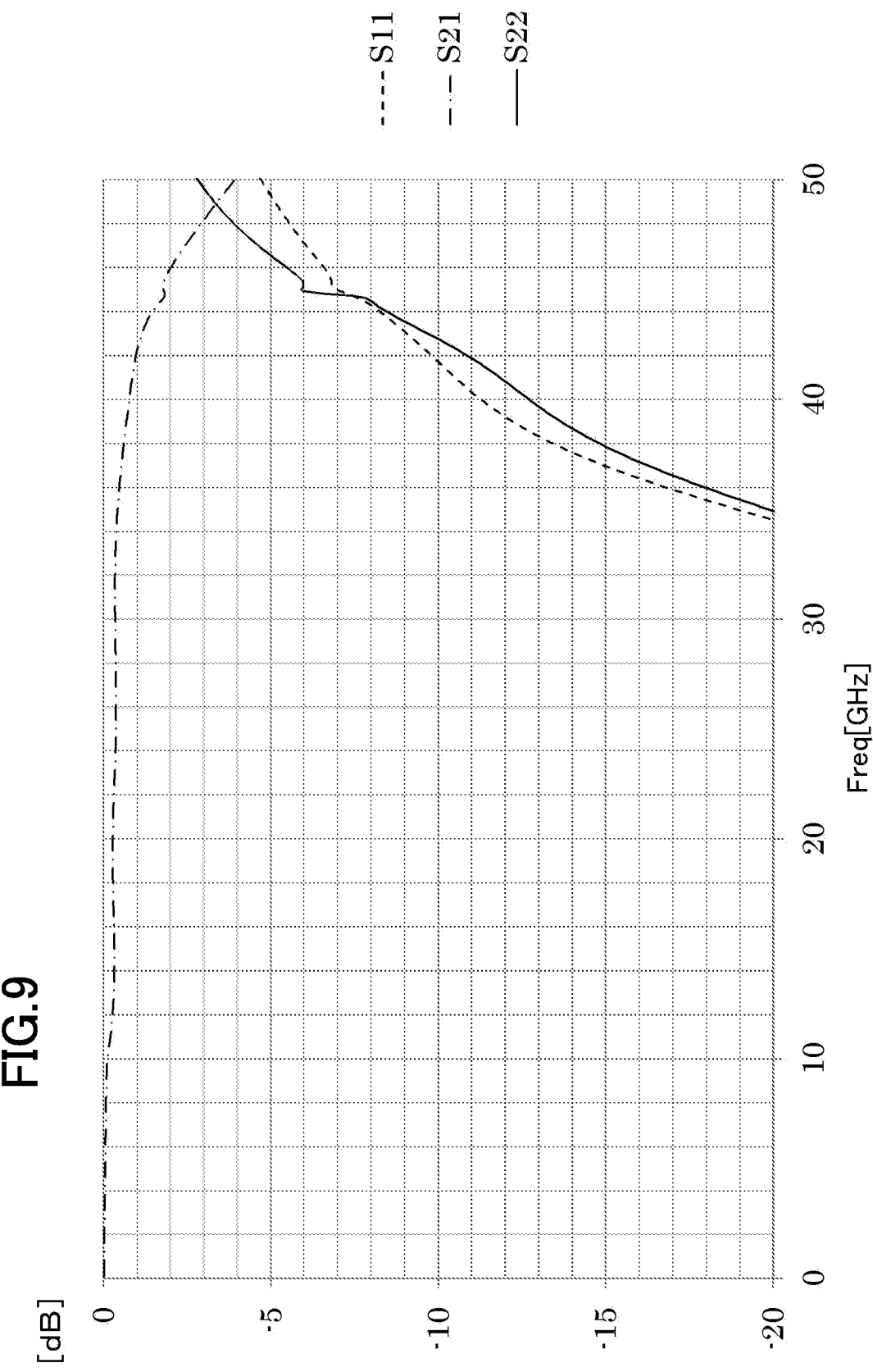
FIG. 9 is a graph in which reflection characteristics and transmission characteristics in the examples illustrated in FIG. 7 and FIG. 8 are calculated with the use of a High Frequency Structure Simulator (HFSS), which is a three-dimensional electromagnetic field solver.

With those configurations, a high-frequency wave signal can be transmitted more stably. FIG. 9 is a graph in which reflection characteristics (S11 and S22) and transmission characteristics (S21) in an example that employs both of the configuration illustrated in FIG. 7 and the configuration illustrated in FIG. 8 are calculated with the use of a High Frequency Structure Simulator (HFSS), which is a three-dimensional electromagnetic field solver. As shown in FIG. 9, stable transmission of a high-frequency wave signal is accomplished by employing the configurations illustrated in FIG. 7 and FIG. 8.

From the results shown in FIG. 9, it is understood that, by connecting between the spacer 170 and the metal block 190 with the use of not only the first bonding wire 181 but also the fourth bonding wire, and by connecting the seat 124 protruding from the eyelet 120 to the metal block 190 with the use of the fifth bonding wire 187, the grounding of the metal block 190 is enhanced, which helps stable transmission of a high-frequency wave signal. The fifth bonding wire 187 preferably includes a plurality of bonding wires.

For signal transmission on the order of 50 Gbits/s, the third bonding wire 183 connecting the first conductor pattern 141 on the device mounting substrate 140 and the second conductor pattern 152 on the relay substrate 150 preferably includes a plurality of bonding wires.

In addition, a configuration in which the third bonding wire 183 electrically connecting between the first conductor pattern 141 and the second conductor pattern 152 is placed between the second bonding wire 182 and the fourth bonding wire 184 when viewed from a direction orthogonal to the third surface 125 is preferred in that inductance parasitic to the third bonding wire 183 can be relaxed.

As illustrated in FIG. 2, FIG. 6, and FIG. 7, the relay substrate 150 has a rectangular shape that has longer sides parallel to a direction extended from the first lead terminal 110 and shorter sides parallel to the first surface 121 of the eyelet 120, when viewed from a direction perpendicular to the third surface 125. In a preferred configuration, a conductor pattern that has a ground potential is absent on the shorter sides of the relay substrate 150, which are parallel to the first surface 121. With this configuration, the length of the longer sides of the relay substrate 150 can be set shorter, and the relay substrate 150 can accordingly be reduced in size and cost.

In the configuration illustrated in FIG. 7, the second ground pattern 148 is formed along one of the longer sides of the relay substrate 150, and a configuration in which a conductor pattern is formed along a longer side is preferred to a configuration in which a conductor pattern is formed along a shorter side in order to downsize the relay substrate 150. The reason is that the second conductor pattern 152 formed on the relay substrate 150 includes the stub 153 as described above. In a configuration in which the relay substrate 150 includes the stub 153, the stub 153 determines the size of the relay substrate 150 in the direction of the shorter sides, and a conductor pattern formed along the longer sides does not change the size of the relay substrate 150 in the direction of the shorter sides much, and has little influence on the size of the relay substrate 150.

A thin film resistor is formed through deposition on the device mounting substrate 140, and is terminated at 25 ohm to 75 ohm by a serial resistor of the optical device 160.

The term "eyelet" indicating a metal disc is used herein. However, there is no essential significance to the eyelet 120 being of a disc shape, and the eyelet 120 may have a polygonal column shape or other shapes.

It should be noted that the optical subassembly 100 may include a bias to the laser diode that is the optical device 160, a bias to a photodiode that monitors backward output, and a thermistor terminal for monitoring the laser temperature.

The foregoing disclosure provides illustration and description, but is not intended to be exhaustive or to limit the implementations to the precise forms disclosed. Modifications and variations may be made in light of the above disclosure or may be acquired from practice of the implementations.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An optical subassembly, comprising:
    an eyelet including a first surface, a second surface arranged on an opposite side from the first surface, and a first through-hole penetrating from the first surface through the second surface;
    a first lead terminal, which is to be inserted into the first through-hole, configured to transmit an electric signal;
    a dielectric material filled in a space between the first through-hole and the first lead terminal;
    a device mounting substrate, on which an optical device configured to convert at least one of an optical signal or the electric signal into the other is to be mounted, and which includes a first conductor pattern configured to transmit the electric signal to the optical device;
    a metal block having mounted thereon the device mounting substrate;
    a temperature regulator located between the metal block and the eyelet;
    a relay substrate including a second conductor pattern configured to transmit the electric signal to the optical device;
    a seat, which protrudes from the first surface in a direction extended from the first through-hole, and has a third surface on which the relay substrate is to be mounted; and
    a spacer interposed between the third surface and the relay substrate to establish conduction between a rear surface of the relay substrate and the seat.

2. The optical subassembly of claim 1,
    wherein the device mounting substrate includes a first ground pattern having a same electric potential as the eyelet, and
    wherein the optical subassembly further comprises:
        a first bonding wire configured to connect a part of the spacer exposed from the relay substrate to the metal block; and
        a second bonding wire configured to connect another part of the spacer exposed from the relay substrate to the first ground pattern.

3. The optical subassembly of claim 2,
    wherein the spacer has:
        a fourth surface on which the relay substrate is to be mounted;
        a fifth surface to be mounted on the seat;
        a sixth surface, which intersects with the fifth surface, opposed to the first surface; and
        a seventh surface, which intersects with the sixth surface, opposed to the fifth surface,
            the sixth surface and the seventh surface being exposed from the relay substrate,
            the first bonding wire being connected to the sixth surface, and
            the second bonding wire being connected to the seventh surface.

4. The optical subassembly of claim 3,
    wherein the spacer has a level difference between the fourth surface and the seventh surface, and
    wherein a distance between the seventh surface and the fifth surface is greater than a distance between the fourth surface and the fifth surface.

5. The optical subassembly of claim 3, wherein the spacer has a groove configured to separate the fourth surface and the seventh surface from each other.

6. The optical subassembly of claim 2, wherein the device mounting substrate includes a first castellation configured to electrically connect between the first ground pattern and the metal block.

7. The optical subassembly of claim 2, further comprising:
    a third bonding wire configured to electrically connect between the first conductor pattern and the second conductor pattern; and
    a fourth bonding wire configured to electrically connect between a second ground pattern and the metal block, the second ground pattern being formed on the relay substrate, wherein the third bonding wire is placed between the second bonding wire and the fourth bonding wire when viewed from a direction orthogonal to the third surface.

8. The optical subassembly of claim 7, further comprising:
    a fifth bonding wire configured to connect between a rear surface of the seat and the metal block, the rear surface being opposed to the third surface of the seat.

9. The optical subassembly of claim 1, wherein the first through-hole has a diameter of 1 mm or more.

10. The optical subassembly of claim 1,
    wherein the temperature regulator is a Peltier device, and wherein the temperature regulator is arranged so as to be superimposed at least partially over the first through-hole when viewed from a direction perpendicular to the first surface.

11. The optical subassembly of claim 1, wherein the relay substrate is provided without a conductor pattern serving as a ground potential on a shorter side parallel to the first surface, when viewed from a direction orthogonal to the third surface.

12. The optical subassembly of claim 1, further comprising:
a third bonding wire configured to electrically connect between the first conductor pattern and the second conductor pattern,
wherein the third bonding wire includes a plurality of bonding wires.

13. An optical module, comprising:
the optical subassembly of claim 1;
a printed circuit board; and
a flexible printed circuit board to be electrically connected to the printed circuit board and the optical subassembly.

14. An optical subassembly, comprising:
an eyelet including a first surface, a second surface arranged on an opposite side from the first surface, and a first through-hole penetrating from the first surface through the second surface;
a first lead terminal, which is to be inserted into the first through-hole, configured to transmit an electric signal;
a device mounting substrate, on which an optical device configured to convert at least one of an optical signal or the electric signal into the other is to be mounted, and which includes a first conductor pattern configured to transmit the electric signal to the optical device;
a relay substrate including a second conductor pattern configured to transmit the electric signal to the optical device;
a seat, which protrudes from the first surface in a direction extended from the first through-hole, and has a third surface on which the relay substrate is to be mounted; and
a spacer interposed between the third surface and the relay substrate to establish conduction between a rear surface of the relay substrate and the seat.

15. The optical subassembly of claim 14,
wherein the device mounting substrate includes a first ground pattern having a same electric potential as the eyelet, and
wherein the optical subassembly further comprises:
a first bonding wire configured to connect a part of the spacer exposed from the relay substrate to a metal block; and
a second bonding wire configured to connect another part of the spacer exposed from the relay substrate to the first ground pattern.

16. The optical subassembly of claim 15,
wherein the spacer has:
a fourth surface on which the relay substrate is to be mounted;
a fifth surface to be mounted on the seat;
a sixth surface, which intersects with the fifth surface, opposed to the first surface; and
a seventh surface, which intersects with the sixth surface, opposed to the fifth surface,
the sixth surface and the seventh surface being exposed from the relay substrate,
the first bonding wire being connected to the sixth surface, and
the second bonding wire being connected to the seventh surface.

17. The optical subassembly of claim 15, wherein the device mounting substrate includes a first castellation configured to electrically connect between the first ground pattern and the metal block.

18. The optical subassembly of claim 15, further comprising:
a third bonding wire configured to electrically connect between the first conductor pattern and the second conductor pattern; and
a fourth bonding wire configured to electrically connect between a second ground pattern and the metal block, the second ground pattern being formed on the relay substrate, wherein the third bonding wire is placed between the second bonding wire and the fourth bonding wire when viewed from a direction orthogonal to the third surface.

19. The optical subassembly of claim 14, further comprising:
a temperature regulator arranged so as to be superimposed at least partially over the first through-hole when viewed from a direction perpendicular to the first surface.

20. The optical subassembly of claim 14, further comprising:
a third bonding wire configured to electrically connect between the first conductor pattern and the second conductor pattern,
wherein the third bonding wire includes a plurality of bonding wires.

* * * * *